US007396984B2

(12) United States Patent
Straubinger

(10) Patent No.: US 7,396,984 B2
(45) Date of Patent: Jul. 8, 2008

(54) FLUTE PADS

(76) Inventor: David J. Straubinger, 5220 S. East Street, Indianapolis (IN) 48227

( * ) Notice: Subject to any disclaimer, the term of this patent is extended or adjusted under 35 U.S.C. 154(b) by 33 days.

(21) Appl. No.: 11/270,437

(22) Filed: Nov. 9, 2005

(65) Prior Publication Data

US 2006/0096442 A1 May 11, 2006

Related U.S. Application Data

(60) Provisional application No. 60/626,719, filed on Nov. 10, 2004.

(51) Int. Cl.
*G01D 7/08* (2006.01)

(52) U.S. Cl. .................................................... 84/385 P

(58) Field of Classification Search ............... 85/385 A, 85/385 R, 385 P; 84/385 A, 385 R, 385 P
See application file for complete search history.

(56) References Cited

U.S. PATENT DOCUMENTS

| | | | | |
|---|---|---|---|---|
| 1,621,395 | A | | 3/1927 | Ciccone |
| 1,728,553 | A | | 9/1929 | Klingler |
| 1,747,113 | A | | 2/1930 | Gulick |
| 1,830,025 | A | | 11/1931 | Gulick |
| 2,292,767 | A | | 8/1942 | Page |
| 2,534,660 | A | | 12/1950 | Collis |
| 2,540,760 | A | | 2/1951 | Schoemann |
| 3,487,742 | A | | 1/1970 | Mills |
| 3,501,991 | A | | 3/1970 | Carruthers et al. |
| 3,688,633 | A | | 9/1972 | Nagao |
| 3,691,892 | A | | 9/1972 | Matsuura et al. |
| 3,767,506 | A | | 10/1973 | Kawakami |
| 3,958,484 | A | | 5/1976 | Nelson et al. |
| 4,114,500 | A | | 9/1978 | Norbeck |
| 4,158,979 | A | | 6/1979 | Suzuki |
| 4,453,444 | A | | 6/1984 | Valentino |
| 4,508,004 | A | | 4/1985 | Pages |
| 4,704,939 | A | * | 11/1987 | Straubinger ............... 84/385 P |
| 4,729,275 | A | | 3/1988 | Elbaz |
| 4,798,122 | A | | 1/1989 | Gisler et al. |
| 4,848,206 | A | | 7/1989 | Yamaryo |
| 4,957,029 | A | | 9/1990 | Kahonen |
| 4,967,632 | A | | 11/1990 | Etheredge, III et al. |
| 5,183,954 | A | * | 2/1993 | Wasser ..................... 84/385 P |
| 5,297,466 | A | | 3/1994 | Wasser |
| 5,309,807 | A | | 5/1994 | Kingma |
| 5,339,719 | A | | 8/1994 | Wasser |
| 5,381,718 | A | | 1/1995 | Wasser |
| 5,417,135 | A | | 5/1995 | Straubinger |
| 5,469,771 | A | | 11/1995 | Wasser |

(Continued)

*Primary Examiner*—Briggitte R. Hammond
(74) *Attorney, Agent, or Firm*—Woodard, Emhardt, Moriarty, McNett & Henry LLP

(57) ABSTRACT

Self-leveling pad assemblies are described having novel backing disks, a cushion layer in contact with the backing disk and a skin covering the cushion and at least one surface of the backing disk. The novel backing disks have an outer collar and a channel at the collar's base about the collar's inner circumference that provides the disk with an enhanced flexing region. The outer collar provides sufficient support for the pad's sealing surface, maintains an even tension on the pad's skin, has sufficient flexibility to allow the pad's surface to conform to an imperfect tone hole and to seal with only a cursory leveling procedure and reduces the number of tears in the pad's skin resulting from repeated contacts with the tone hole and from fluctuations in the skin's moisture content.

27 Claims, 6 Drawing Sheets

U.S. PATENT DOCUMENTS

| | | | | |
|---|---|---|---|---|
| 5,717,151 | A * | 2/1998 | Straubinger ............... | 84/385 P |
| 5,900,562 | A | 5/1999 | Smeding | |
| 6,015,946 | A | 1/2000 | Yamaryo | |
| 6,028,256 | A * | 2/2000 | Straubinger ............... | 84/385 P |
| 6,225,541 | B1 | 5/2001 | Kodera et al. | |
| 6,265,649 | B1 | 7/2001 | Smeding | |
| 6,284,958 | B1 | 9/2001 | Aoki et al. | |
| 6,326,533 | B1 | 12/2001 | Kodera | |
| 6,344,604 | B1 * | 2/2002 | Schmidt .................. | 84/385 P |
| 6,664,455 | B2 | 12/2003 | Aoki | |
| 6,683,235 | B2 | 1/2004 | Aoki | |
| 6,940,007 | B2 | 9/2005 | Schmidt | |
| 6,972,361 | B2 | 12/2005 | Shibamiya et al. | |
| 2004/0129128 | A1 | 7/2004 | Shibamiya et al. | |
| 2005/0235807 | A1 | 10/2005 | Kraus | |

* cited by examiner

FLUTE PADS

This application claims the benefit of U.S. Provisional Patent Application Ser. No. 60/626,719, filed Nov. 10, 2004.

BACKGROUND

This invention relates generally to a tone hole covering for wind instruments having a novel backing disk with an outer collar capable of flexing to conform the pad's surface to the tone hole and provide an effective seal. The backing disk's flexibility allows the pad to conform to the tone hole's surface with minimal pressure even when not properly adjusted and reduces damage and wear caused by repeated contacts with the tone hole. Although generally applicable to all woodwind instruments, embodiments of the present invention are especially suited for use in flutes.

During this century, instrument tone hole coverings, also called pad assemblies or simply pads, have typically comprised a cardboard backed wool felt disk covered with Goldbeater's skin, wrapped around the cardboard and glued to its backside. The pad is fixed in a pad cup mounted over an instrument tone hole on a hinged mechanism so that the tone hole is sealed when the pad is in its closed position. Although such pads can initially be made to seal well, sensitivity to its environment and lack of dimensional stability of the felt and skin causes the pad surface to lose its integrity and allow air to leak at the interface between the pad and the tone hole.

U.S. Pat. No. 4,704,939 issued in 1987, disclosing a new pad that can maintain a flat sealing surface regardless of variations in temperature, moisture, or altitude. As a result of this design, pad life is extended and closure of the tone hole consistently requires only a light touch by the musician. To accomplish these advantages, the improved pad has a semi-rigid supporting unit for the felt. The pad's design allows its surfaces to be tilted to fit a tone hole with a perfectly planar surface through the leveling process of triangulation or, by a wedging action, to distort the planar surface to perfectly match a damaged or imperfect tone hole.

One embodiment of these improved pads is constructed by stretching a skin across a cushion ring fitted within a recess formed between inner and outer collars on the lower radial face of a rigid backing disk having a bendable lower margin. The skin is folded around the edge of the backing disk and secured to the disk's back side. The pad is secured to its cup with a retainer comprising a washer and a screw combination attached to a pad nut which is in turn attached to the bottom of a pad cup and centrally located within the cup's cavity. Upon tightening the retaining screw of the assembled unit, the flat washer forces the skin against the rigid inner collar. Other methods are also known for securing the pad assembly within the pad cup, including the usual friction held retainer utilized in French or open-hole pads.

Further improvements in pad design and methods of seating pad assemblies have been made which utilize a stabilizing disk locked in an adjusted position with an adhesive, to better support a flexible backing disk having inner and outer collars. As before, a cushion layer of uniform thickness is positioned between the inner and outer collars covered by the pad's sealing surface covered with a skin. Should the pad need further adjustment, the pad's surface can be made to coincide with the tone hole's surface by the usual wedging action of partial shims placed between the stabilizing and backing disks. U.S. Pat. No. 6,028,256 issued in 2000, and teaches that tension on the pad's skin can be reduced by providing the backing disk's outer collar with an upper curved lip formed by undercutting the backing disk's outer collar. The improved backing disk minimizes damages to a pad assembly's skin due to repeated contacts with a tone hole and environmental conditions.

Although pads manufactured according to these improved designs have performed well, rigorous leveling of pads is still required when initially installed on a flute and from time-to-time during the pad's lifetime. Because the leveling process is both time consuming and expensive a pad assembly is needed that is capable of conforming to the tone hole's surface without a rigorous leveling procedure and without sacrificing tone, touch, and other performance attributes important to the musician. The present invention addresses these needs.

SUMMARY

As will become apparent from the following discussion, this invention provides for a novel backing disk and pad assembly having components that enable the pad to form a seal with an imperfect tone hole and enable a tone hole to be sealed by an imperfectly leveled pad. One aspect of the present invention is directed to a backing disk comprising a disk having first and second surfaces, an outer flexible collar positioned on the second surface, a channel proximate the collar and an enhanced flexing region proximate the channel. Disks having the channel positioned within the disk's second surface proximate the base of the flexible collar are preferred.

The presence of a channel proximate the backing disk's outer collar increases the effective height of the collar and introduces a region of enhanced flexibility proximate the collar's base. Because a deeper channel provides a collar with a greater effective height and a narrower region of the disk proximate the channel, the collar has a maximum, ability to flex inward upon experiencing an inward force. Conversely a backing disk having a shallow channel provides a collar with a shorter effective height and a thicker region of the disk proximate the channel providing the collar with a reduced ability to flex inward. The ability of the backing disk's collar to flex inward upon experiencing an inward force allows the surface of a pad assembly utilizing the novel backing disk to distort or self-adjust upon contacting a tone hole. Pad assemblies utilizing backing disks having channels ranging from shallow to deep provide a range of abilities to self-adjust.

To provide the advantages of this invention, the thickness of the enhanced flexing region should range from about 0.001 of an inch to about 0.025 of an inch, depending on the material of construction. The edge of the outer collar can also optionally have a plurality of slits about its circumference that enable a segment of the collar to flex independently of another segment upon encountering a force. The novel backing disks can be made from metals or polymeric materials capable of being machined or from polymeric materials capable of being molded. For backing disks constructed of metal, the thickness of the flexing region should be at the lower end of the range provided. For backing disks constructed of polymeric materials, the thickness of the flexing region can be greater, depending on the polymer's flexibility and strength. The preferred backing disks have been constructed by machining stock materials made from a variety of polymers.

A further aspect of the present invention is directed to a pad assembly for closure of a wind instrument tone hole comprising a backing disk having a first surface and a second surface, an outer flexible collar positioned on the disk's second surface, a channel proximate the collar and an enhanced flexing region proximate the channel; a cushion having a first and second surface, the cushion's first surface positioned against the disk's second surface, proximate the outer flexible collar;

and a sealing skin, the sealing skin covering the disk's second surface, the cushion and outer flexible collar and fastened to the disk's first surface.

Pad assemblies having the improved backing disks provide a pad surface with varying ability to conform to the surface of a tone hole. For example, pad assemblies having a backing disk with a narrow outer collar and a deeper channel and correspondingly narrower enhanced flexing region provide a pad surface with a greater ability to conform to an imperfect tone hole and require only a cursory leveling procedure. Pad assemblies having a backing disk with a narrow outer collar and a shallow channel and correspondingly thicker enhanced flexing region provide a pad surface with a lesser ability to conform to the tone hole's surface. By varying the collar's thickness and the depth of the channel the pad's ability to self-adjust and the feel of the pad to the musician can be controlled. The ability of the pad assembly to conform to a tone hole can be further enhanced by increasing the flexibility of the cushion. Cushions having a recess in contact with the backing disk opposite the region of contact with the tone hole rim can provide additional flexibility.

The pad assemblies utilizing the novel backing disk provide a range of ability to self-level without sacrificing tone quality or significantly changing the feel to the musician. As a result, the novel pad assemblies can be employed in a wide variety of instruments ranging from student instruments to handmade professional instruments. Although the novel backing disk and pad assembly are particularly suited for a flute, other instruments can similarly benefit from applicant's improved backing disk and pad assembly.

DRAWINGS

Figure 6:
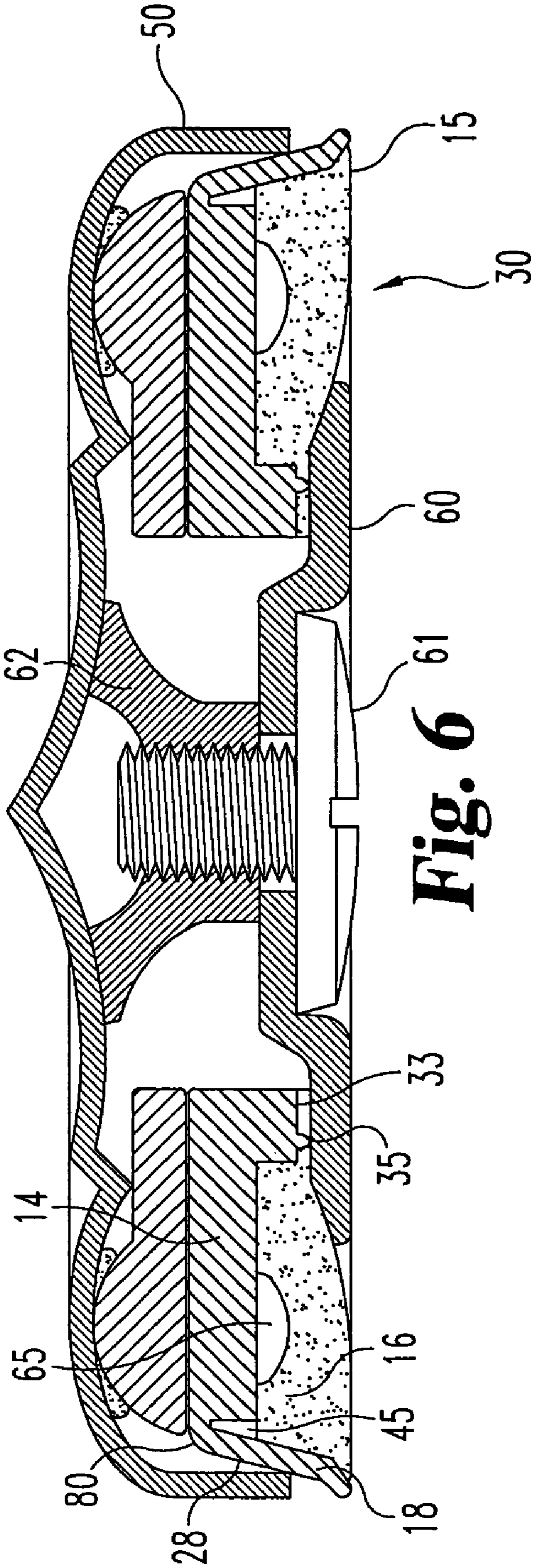

FIG. 6 illustrates a lateral view of a pad assembly mounted in a pad cup, the pad assembly including an improved backing disk having a rigid inner collar, an outer flexible collar, a channel adjacent the outer collar's inner circumference, a cushion having a recess in contact with the backing disk in the region between the rigid collar and the flexible collar, and a skin covering the cushion and fastened to the back of the backing disk.

Figure 7:
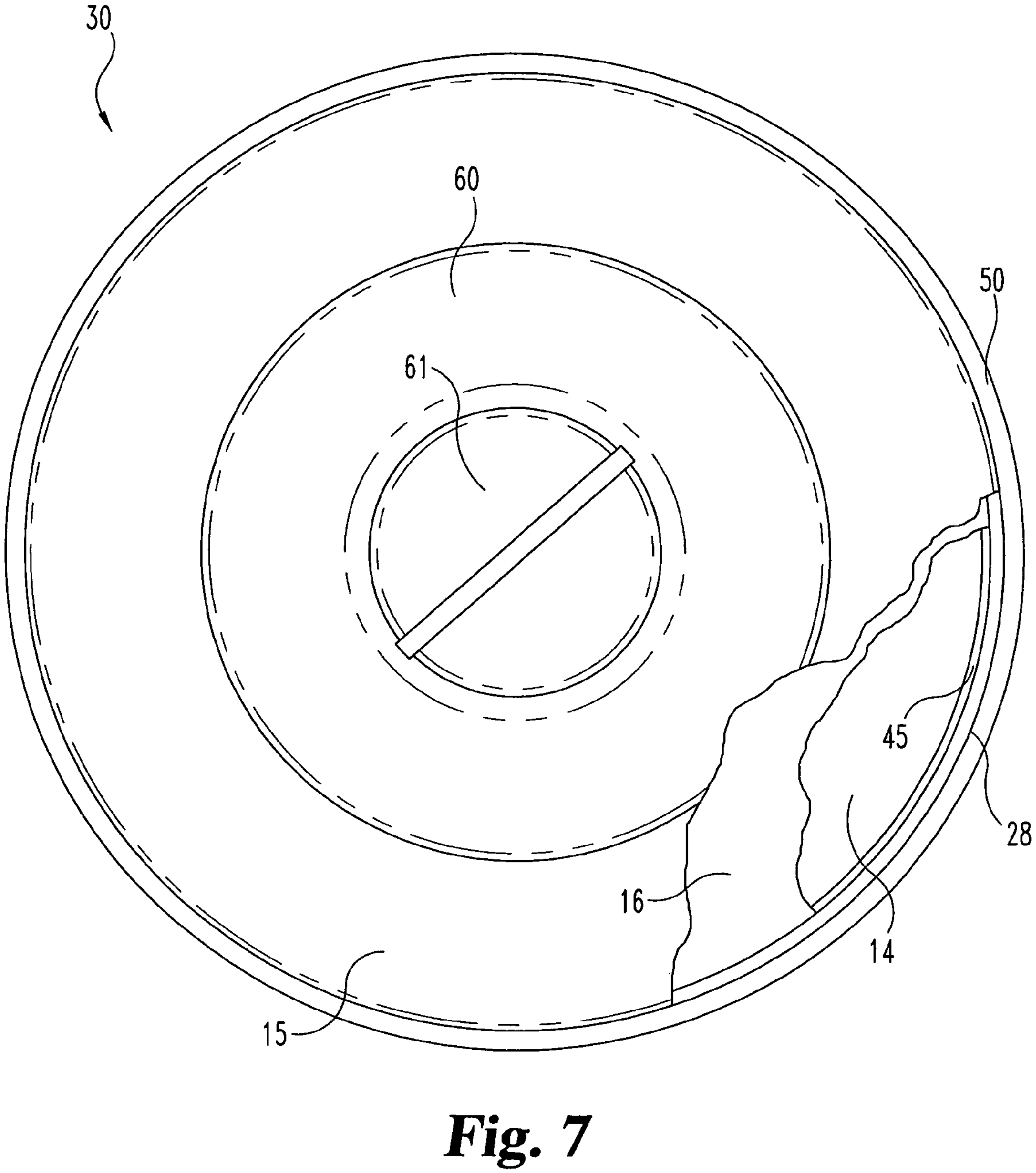

FIG. 7 illustrates a perspective view of the pad assembly shown in FIG. 6, partially broken away. The portion broken away shows the position of the cushion and backing disk below the skin in the pad assembly.

Figure 8:
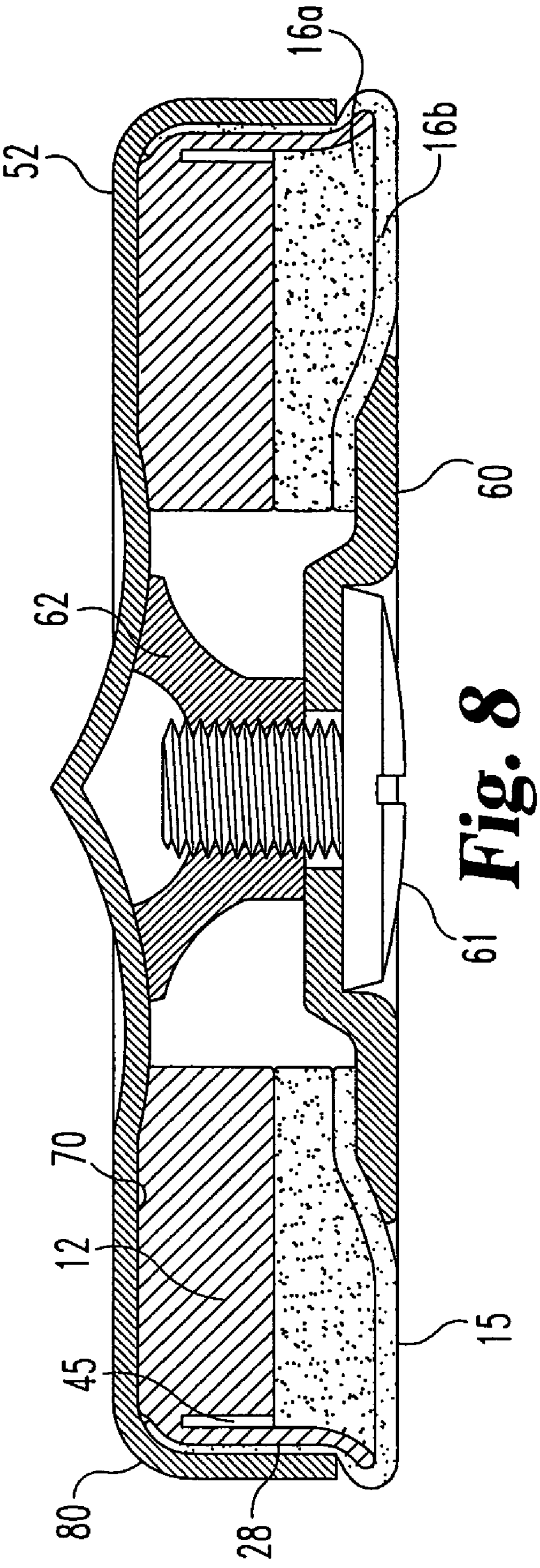

FIG. 8 illustrates a lateral view of a pad assembly lacking a stabilizing disk and having two layers of cushion mounted into a pad cup having a flat inner surface. A portion of the cushion layer in contact with the skin extends over the edge of the collar on the novel backing disk.

DESCRIPTION

For the purposes of promoting an understanding of the principles of this invention, references will now be made to several embodiments and specific language will be used to describe the same. It will nevertheless be understood that no limitation of the scope of the invention is thereby intended, such alterations and further modifications and applications of the principles of the invention as described herein being contemplated as would normally occur to one skilled in the art to which the invention relates.

This invention relates to novel backing disks and pad assemblies utilizing the novel backing disks. Pad assemblies incorporating the new backing disks provide the necessary support for the pad's sealing surface, maintain an even tension on the pad's skin, further reduce the incidence of tears in the skin resulting from fluctuations in moisture and repeated contacts with the tone hole surface and provide a greater tolerance of imperfections in the tone hole's surface. In addition the pad assemblies containing particular embodiments of the new backing disk have self-leveling abilities and can be installed with only a cursory leveling procedure that can reduce the cost of pad installation.

Embodiments of this invention are applicable to both open (French) and closed hole covering assemblies. Conventional tone hole covering assemblies are composed of several components described in detail below. As used herein, the term pad cup refers to a shallow cylindrical cup having cylindrical walls and an endplate attached to one side. Closed hole assemblies have a solid endplate attached to one side and a pad nut or short column centrally located within the pad cup and attached to the endplate. The end plate can be planar to receive a backing disk directly or non-planar and shaped to receive a stabilizing disk having at least one planar surface that can in turn accept a backing disk. The endplate for an open hole assembly has a central cavity with a chimney or short cylindrical column within the pad cup, attached to the endplate and centrally located so that cavities within the chimney and the endplate form a continuous region.

The pad assembly is composed of a backing disk and cushion layer covered by a sealing surface means generally comprising one or more layers of a sealing skin. The cushion layer can be a single layer of material or be composed of multiple layers. The pad assembly is held within the pad cup by a retainer. The term retainer commonly refers to a washer and fastener combination having means for attaching the fastener to the centrally located pad nut and retaining the pad assembly within the closed hole pad cup. For closed hole flutes the retainer is commonly a threaded shaft. For open hole assemblies, the retainer generally comprises a friction held collar positioned within the open hole pad cup's chimney. For closed hole flutes, the more common means for attaching a retainer's threaded shaft to the pad nut includes a threaded cavity centrally located within the pad nut.

The term "second side" utilized in referring to specific sides of a stabilizing disk, an adjusting disk, or a pad assembly, refers to the side of the structure facing the pad's sealing surface when the components have been assembled and installed within a pad cup. The term "first side" similarly refers to the side of a structure facing opposite the pad's sealing surface in the assembled structure. The term rigid when applied to the backing disk's inner and outer collars indicates a condition wherein the backing disk is a component of a pad assembly installed within a pad cup and the collar does not deflect when the pad's skin contracts because of fluctuations in moisture or because of contact of the pad's sealing surface with the tone hole. The term flexible when applied to the inner and outer collars indicates a condition wherein the collar is deflected under these same conditions.

A stabilizing disk is a washer-shaped disk having at least one planar surface, an opening within the disk's central region sufficiently large to fit over the central pad nut or chimney. A stabilizing disk can be rigid or have a region located at or near the disk's circumference which can deflect to conform the surface of its second side to the contour of the tone hole surface. The stabilizing disk can be made of metal, a polymeric material, or a combination of these materials. Stabilizing disks made from polymeric materials can be cut, machined, or molded from stock materials. For pad assemblies with a particularly thick cushion layer a pad cup having a flat inner surface can be used making it possible to place the pad assembly into the pad cup without the need for a stabilizing disk.

Backing disks are disks, generally washer-shaped disks having at least on planar surface capable of supporting a cushion layer covered with a skin attached to the backing disk's first or back side. Backing disks may additionally have inner and outer collars forming a recess therebetween to receive the cushion layer or only an outer collar. One aspect of the present invention is a backing disk having first and second surfaces, the second surface having a narrow outer flexible collar and a channel proximate the collar's inner base. The disks outer flexible collar can be straight or additionally have a curved upper lip and/or have a plurality of slits about the collar's circumference. One preferred embodiment of the novel backing disk additionally has a rigid inner collar having a height either the same or shorter than the outer flexible collar. A second preferred embodiment lacks an inner collar. The upper edge of the inner column, when utilized can be flat or have a ridge that is blunt, sharp or curved. The new backing disks can be made of metal or a polymeric material. Backing disks made from polymeric materials can be cut, machined, or molded from stock materials. Backing disks made from polymeric materials are generally preferred.

The cushion utilized in pad assemblies is a washer shaped disk made from a compressible material sized to fit against the backing disk's second side in the region of the pad assembly that will contact the tone hole surface. The cushion can be constructed from any material having a uniform thickness that can be cut into rings or otherwise formed. Single or multiple layers of cushion material can be employed. The cushion material must be capable of both supporting the pad's sealing surface and providing sufficient flexibility to conform to the tone hole's surface. Suitable cushion materials include natural materials such as wool felt and synthetic materials such as ULTRASUEDE, SCOTTFELT (mfr grade 900) or compressible polymers such as polyurethanes, silicon rubber and the like. ULTRASUEDE is a synthetic suede having polyester fibers impregnated with polyurethane manufactured by the Toray Co. Ltd. of Japan. SCOTTFLET is a registered trademark of the Scottfoam Corp oration of Eddystone, Pa.

The skin utilized to cover the cushion and backing disk has traditionally been a membrane made from animal intestines. The skin is sometimes referred to as "fish skin" or "Goldbeater's skin". The skin is sensitive to moisture from the atmosphere, the musician's breath and saliva and changes its dimensions according to its moisture level.

Figure 1:
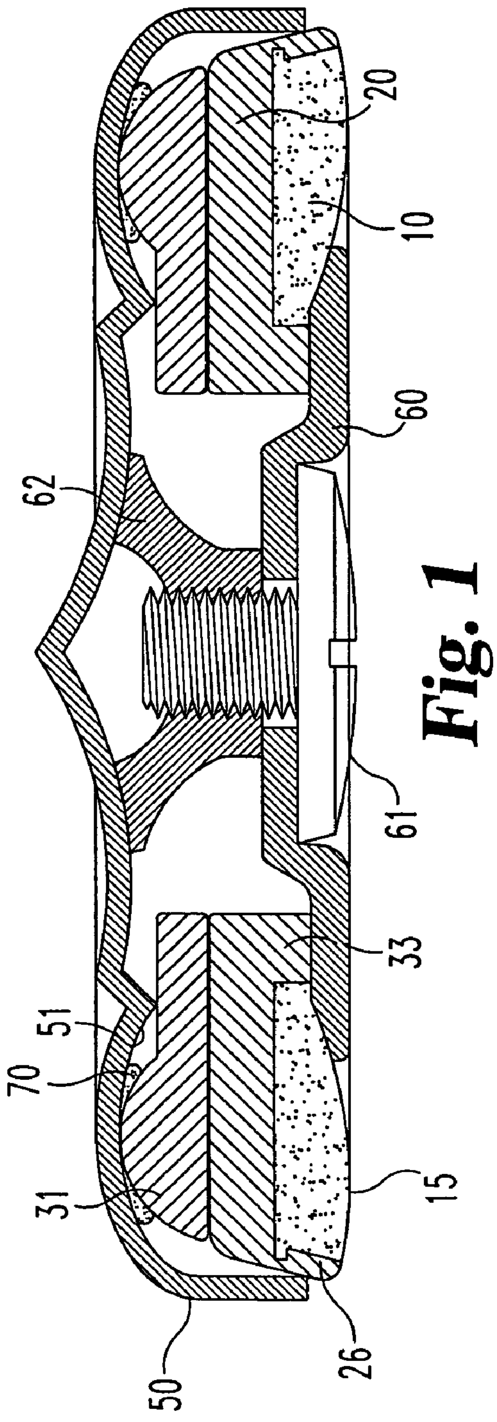
Fig. 1 (PRIOR ART)
FIG. 1 illustrates a lateral view of a conventional prior art pad assembly utilizing a backing disk having rigid inner and outer collars.

A more detailed description of the invention follows and refers to the appended drawings. FIG. 1 shows a prior art standard pad assembly mounted in a pad cup 50 containing a stabilizing disk 31 resting against the pad cup's end-plate 51 with an adhesive layer 70. The pad assembly comprising a backing disk 20 having rigid inner and outer coaxial collars 33 and 26, respectively forming a recess therebetween, a cushion ring 10 within the recess and a sealing surface typically a layer of a skin 15 covering the cushion and collars and fastened to the backing disk opposite the cushion and collars with an adhesive. The pad assembly is held in the pad cup with a retainer that includes a washer 60 and screw 61 engaged within pad nut 62. The stabilizing and backing disks can be rigid or flexible. Because wind instruments and flutes vary in size, as do their tone holes, the dimensions of tone hole pads must vary accordingly. Generally pad cups have internal diameters ranging from about 0.300 to 0.750 inches and corresponding pad assemblies are sized to fit closely within the pad cup. The thickness of rigid coaxial collars on prior art backing disks have generally ranged from between about 0.010 and 0.020 inches and their height has generally ranged between about 0.020 and 0.030 inches.

Figure 2:
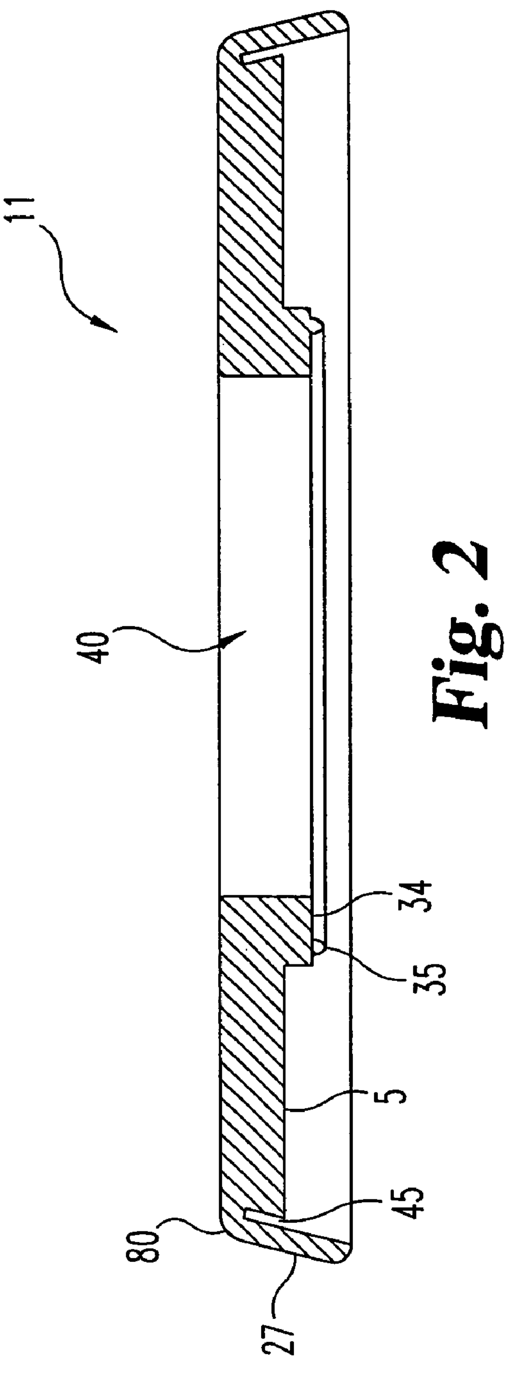
FIG. 2 illustrates a lateral view of a backing disk having inner and outer collars, the disk having a channel adjacent the outer collar's inner circumference.

FIG. 2 illustrates a novel backing disk 11 having an outer flexible collar 27 and an inner rigid collar 34 on the disk's second side, and a recess 5 for receiving a pad cushion positioned therebetween. The flexibility of outer collar 27 is achieved by limiting its width and by placing a channel 45 within the disk's second surface about the inner base of the outer flexible collar 27. Introduction of channel 45 in a surface of disk 11 creates a region of enhanced flexibility 80 beneath channel 45. By positioning channel 45 in the disk's second surface at the base of the collar, the height of the collar measured from the channel's bottom (the collar's effective height) is increased. The increased effective height of the collar and the presence of a region of enhanced flexibility coupled with the collar's reduced thickness enhances the ability of collar 27 to flex inward upon experiencing an inward force. Inner collar 34 additionally has an upper ridge 35 for contacting the cushion when installed. Backing disk 11 additionally has a cavity 40 to fit over the pad nut 62 (in FIG. 5).

Figure 3:
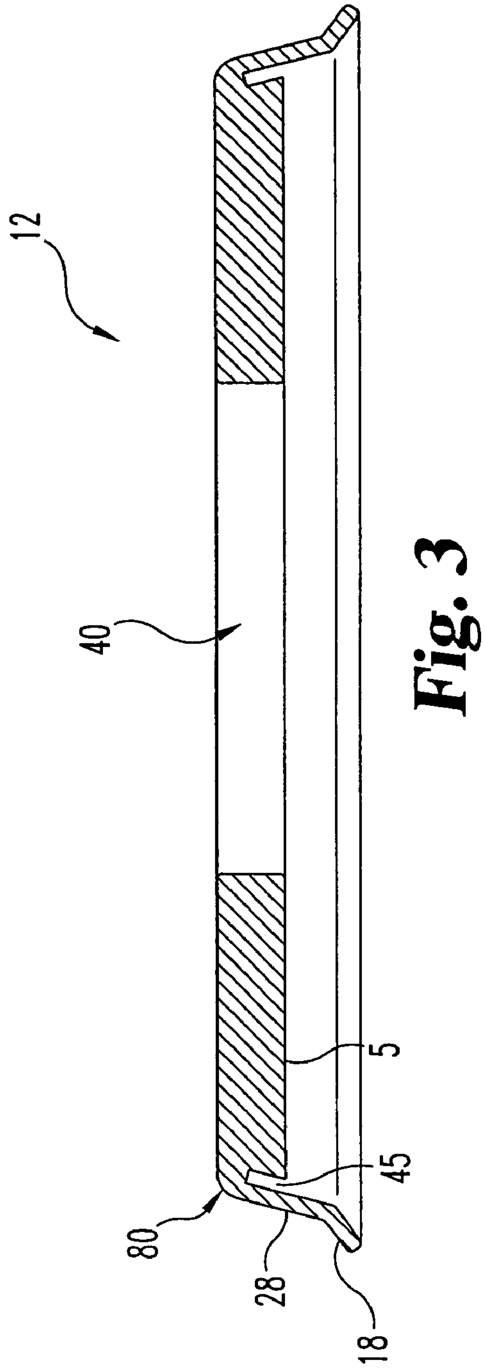
FIG. 3 illustrates a lateral view of a backing disk having an outer collar, the outer collar having a lip that curves outward and the disk having a channel adjacent the outer collar's inner circumference.

FIG. 3 shows backing disk 12, an adaptation of backing disk 11 having a narrow outer collar 28 and channel 45 at the collar's inward circumference to increase the collar's effective height and flexibility. The collar 28 additionally has an upper lip 18 that curves outward. Collar 28, like collar 27 in FIG. 2 has an enhanced ability to flex inward upon experiencing an inward force because its narrow structure, the presence of channel 45 at the base of collar 28, and because of the region of enhanced flexibility 80 beneath channel 45. Unlike backing disk 11, backing disk 12 does not have an inner collar. Backing disk 12 can accept a cushion layer on its second surface either between outer collar 28 and the inner cavity 40 or alternatively the cushion layer can extend outward over collar 28.

Figure 4:
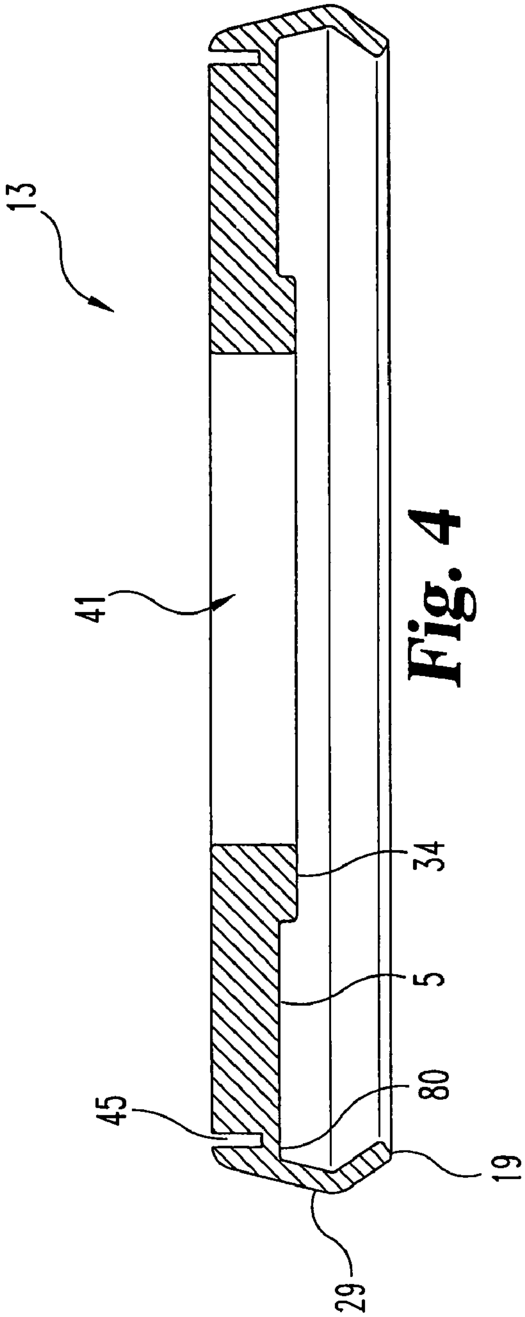
FIG. 4 illustrates a lateral view of a backing disk suitable for installation in an open hole flute pad the disk having inner and outer collars, the outer collar having a lip that curves inward and the disk having a channel on the disk's first surface proximate the outer collar.

FIG. 4 shows backing disk 13 having a narrow outer collar 29 and channel 45 on the disk's first side near the collar. Channel 45 increases the flexibility of collar 29 by providing a region of enhanced flexibility 80 proximate channel 45. The outer flexible collar 29 additionally has an upper lip 19 that curves inward. Because backing disk 13 is designed for an open hole flute pad assembly cavity 41 is larger than cavity 40 in FIG. 2. Like backing disk 11, backing disk 13 has an inner rigid collar 34, but lacks ridge 35.

Figure 5:
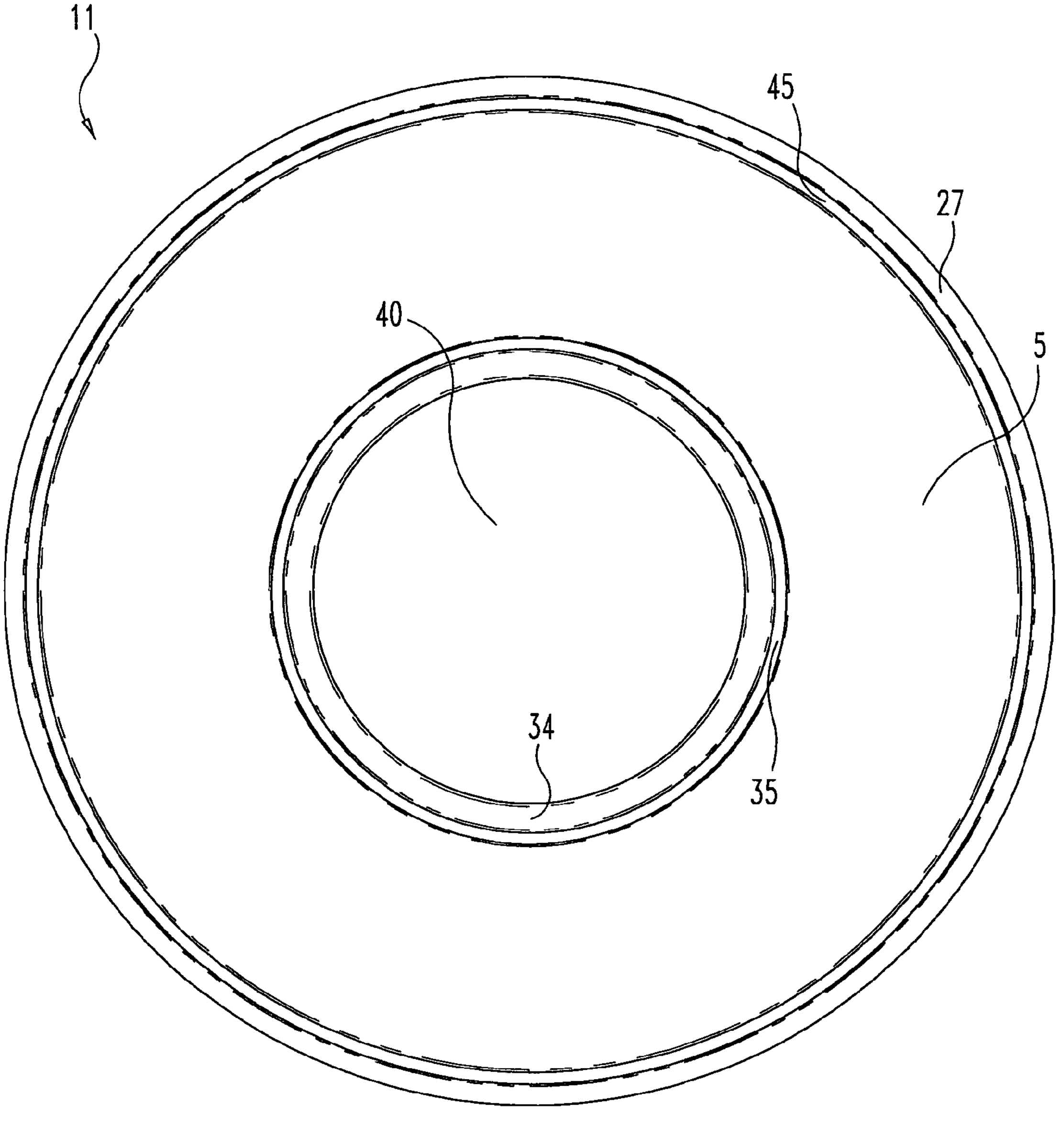
FIG. 5 illustrates a perspective view of the backing disk shown in FIG. 2 having inner and outer collars, the disk having a channel adjacent the outer collar's inner circumference.

FIG. 5 shows a view of the second side of backing disk 11 having a the narrow collar 27 about the circumference of disk 11, channel 45 at the base of collar 27, inner collar 34 having ridge 35, inner cavity 40 and recess 5 for accepting a cushion layer.

FIG. 6 shows an embodiment of applicant's new pad assembly 30 mounted within pad cup 50, the pad assembly including a novel backing disk 14. Backing disk 14 has a flexible collar 28 having an upper curved lip 18, a flexible collar 28, a channel 45 located at the base of collar 28 and above an enhanced region of flexibility 80, an inner collar 33 having a ridge 35 about the upper circumference of collar 33. Cushion 16 has a recess 65 in contact with the second side of disk 14 in the region of contact with a tone hole, the cushion located between outer collar 28 and extending over inner collar 33 and ridge 35. A skin 15 covers collars 33 and 28, ridge 35 and cushion 16 and is fastened to the back side of backing disk 14. As discussed above, the pad assemblies can similarly employ a backing disk having a straight edge (FIG. 2), or an upper lip curving inward (FIG. 4). Similarly, pad assemblies can be designed to fit into open or closed hole pad cup assemblies.

FIG. 7 shows a view the second side of the pad assembly 30 shown in FIG. 6 mounted within pad cup 50. Cushion 16 is held onto backing disk 14 with skin 15 fastened to the first side of backing disk 14 and pad assembly 30 is held within the pad cup by washer 60 and fastener 61. Cushion 16 has a recess 65 (FIG. 6) in contact with backing disk 14 in the region of contact with the tone hole, between inner collar 33 and flexible outer collar 28. Recess 65 works with the backing disk's flexible collar 28 proximate channel 45 to soften the pad's surface in contact with the tone hole and further enhance its ability to self-adjust to the tone hole.

FIG. 8 illustrates the utilization of applicant's pad assembly without a stabilizing disk in pad cup 52 having a planar inner surface 70. The pad assembly comprising backing disk 12, a cushion comprising two layers of felt 16*a* and 16*b*, one of which extends over the upper edge of collar 28, and skin 15. A portion of cushion, layer 16*b* extends over the upper edge of collar 28 to provide skin 15 additional protection from direct contact with the narrow upper lip of collar 28.

The novel backing disks having an outer flexible collar illustrated in FIGS. 2 through 8 can be machined from stock metal or polymeric materials or molded from reactive polymers or polymers having a sufficiently low glass transition temperature utilizing methods known to those skilled in the art. Materials that have proven particularly suitable include aluminum, polypropylene, polyethylene, polyoxymethylene (acetal), and polytetrafluroethylene. The height of the flexible outer collar is dependent on the height of the cushion and generally ranges between about 0.020 and 0.031 inches. The flexible outer collar's thickness varies according to the material of construction and is determined by the amount of flexibility desired. Generally flexible outer collars range in thickness from about 0.003 to 0.015 inches. For a backing disk constructed from polyoxymethylene(acetal), the flexible outer collar has a preferred thickness of between about 0.005 and 0.012 inches and a more preferred thickness of between about 0.006 and about 0.010 inches. The depth of the backing disk's channel can be varied widely to provide a desired flexibility while retaining the disk's structural integrity. Backing disks having a channel depth that leaves a flexing region in the backing disk below the channel having a thickness of from about 0.001 of an inch to about 0.025 of an inch have provided a range of flexibility without sacrificing the disk's integrity. The more narrow regions of enhanced flexibility are generally suitable for backing disks constructed of metal. Whereas for polymeric materials regions of enhanced flexibility ranging from about 0.002 of an inch to about 0.025 of an inch have provided some level of flexibility. For backing disks constructed of polyoxymethylene(acetal), enhanced regions of flexibility ranging from about 0.002 of an inch to about 0.012 of an inch are preferred whereas enhanced flexing regions ranging from about 0.004 of an inch to about 0.008 of an inch are more preferred. Regardless of the material of construction more shallow channels generally provide a thicker region of enhanced flexibility. By varying the depth of the channel and resulting thickness of the region of enhanced flexibility self-leveling backing disks can be constructed that still provide a desirable feel to a musician. The upper lip utilized with some flexible outer collars generally has about the same thickness as the outer collar, but can have a thickness greater or less than the rest of the outer collar. The introduction of a plurality of slits about the flexible collar's circumference can similarly enhance the collar's flexibility. The number of slits contemplated can range from about 4 to as many as 72. The depth of the slits can vary as needed to enhance the collar's flexibility.

The methods for utilizing the novel backing disks and pad assemblies disclosed and claimed herein for tone hole coverings for woodwinds, particularly flutes, and conforming their sealing surface to a tone hole are well known and have been described in the art.

This invention can be used to replace pad assemblies in older instruments and in original equipment. In addition, the inventions sealing surface can be made to conform to the tone hole surface with a variety of known techniques. Depending on the level of flexibility imparted to the backing disk's outer collar a normal leveling technique may be required or only a cursory leveling procedure may be used. As a result, embodiments of applicant's novel pad assemblies are suitable for use in a range of instruments from hand made flutes used by professional musicians to the less expensive student flutes.

Applicant's new pad assemblies having a backing disk with a flexible outer collar are not only better able to conform to the surface of a tone hole, but can be made to maintain the necessary level of support for the pad's sealing surface and maintain an even tension on the pad's skin. As a result, the pad's surface continues to provide a superior seal with fewer tears of the skin.

While applicant's invention has been described in detail above with reference to specific embodiments, it will be understood that modifications and alterations in embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

What is claimed is:

1. A backing disk for supporting the sealing surface of a wind instrument's pad assembly comprising a disk having:
- (a) a first surface;
- (b) a second surface:
- (c) an outer flexible collar positioned on the second surface and having an inner circumference;
- (d) a channel positioned within the first or second surface adjacent the flexible collar proximate the inner circumference; and
- (e) an enhanced flexing region proximate the channel, providing the collar with an enhanced ability to flex in the direction of an applied force, wherein the first surface is adapted to be positioned in the pad assembly opposite the sealing surface and the second surface is adapted to be positioned in the pad assembly facing the sealing surface.

2. The backing disk according to claim 1, wherein the channel is positioned within the disk's second surface.

3. The backing disk according to claim 2, wherein the enhanced flexing region has a thickness of from about 0.001 of an inch to about 0.025 of an inch.

4. The backing disk according to claim 3, wherein the collar has a width ranging from about 0.001 of an inch to about 0.025 of an inch.

5. The backing disk according to claim 4, wherein the collar has an upper curved lip.

6. The backing disk according to claim 5, wherein the upper lip curves outward.

7. The backing disk according to claim 5, wherein the upper lip curves inward.

8. The backing disk according to claim 1, wherein the disk has an inner collar, coaxial to the outer collar, the inner and outer collars forming a recess therebetween.

9. The backing disk according to claim 8, wherein the inner collar is shorter than the outer collar.

10. The backing disk according to claim 4, wherein the disk is constructed of a metal.

11. The backing disk according to claim 4, wherein the disk is constructed of a polymer material selected from the group consisting of polypropylene, polycarbonate, polyethylene, polyoxymethylene(acetal) and polytetrafluoroethylene.

12. The backing disk according to claim 11, wherein the backing disk is constructed of polyoxymethylene(acetal) and the enhanced region of flexibility has a thickness of from about 0.004 of an inch to about 0.008 of an inch.

13. The backing disk of claim 1, wherein the channel is positioned within the disk's first surface.

14. A pad assembly for closure of a wind instrument tone hole comprising:

(a) a backing disk having:

(i) a first surface;

(ii) a second surface:

(iii) an outer flexible collar positioned on the second surface and having an inner circumference;

(iv) a channel positioned within the first or second surface adjacent the flexible collar proximate the inner circumference; and (v) an enhanced flexing region proximate the channel, providing the collar with an enhanced ability to flex in the direction of an applied force, wherein the first surface is adapted to be positioned in the pad assembly opposite the sealing surface and the second surface is adapted to be positioned in the pad assembly facing the sealing surface (b) a cushion having a first surface and a second surface, the cushion's first surface positioned against the disk's second surface, proximate the outer flexible collar; and (c) a sealing skin, the sealing skin covering the disk's second surface, the cushion and outer flexible collar.

15. The pad assembly of claim 14, wherein the channel is positioned within the disk's second surface.

16. The pad assembly of claim 14, wherein the channel is positioned within the disk's first surface.

17. The pad according to claim 15, wherein the enhanced flexing region has a thickness of from about 0.001 of an inch to about 0.025 of an inch.

18. The pad assembly according to claim 17, wherein the collar has a curved upper lip.

19. The pad assembly according to claim 17, wherein the disk has an inner collar, coaxial to the outer collar, the inner and outer collars forming a recess therebetween.

20. The pad assembly according to claim 19, wherein the inner-collar is shorter than the outer collar.

21. The pad assembly according to claim 17, wherein the cushion extends over the outer flexible collar.

22. The pad assembly of claim 17, wherein the cushion comprises at least two layers and at least one layer extends over the flexible outer collar.

23. The pad assembly according to claim 17, wherein the cushion extends to the outer flexible collar.

24. The pad assembly according to claim 14 wherein the cushion has a recess in contact with the backing disk.

25. The pad assembly according to claim 14, wherein the disk is constructed of a metal.

26. The pad assembly according to claim 14, wherein the disk is constructed of a polymer material selected from the group consisting of polypropylene, polycarbonate, polyethylene, polyoxymethylene(acetal) and polytetrafluoroethylene.

27. A flute having the pad assembly of claim 14 positioned over at least one tone hole.

* * * * *